United States Patent [19]
Kordesch et al.

[11] Patent Number: 5,281,497
[45] Date of Patent: Jan. 25, 1994

[54] LOW MERCURY OR MERCURY FREE ALKALINE MANGANESE DIOXIDE-ZINC CELL

[75] Inventors: Karl Kordesch, Graz, Austria; Josef Daniel-Ivad, Richmond Hill; Robert Flack, Markham, both of Canada

[73] Assignee: Battery Technologies Inc., Richmond Hill, Canada

[21] Appl. No.: 994,586

[22] Filed: Dec. 21, 1992

[30] Foreign Application Priority Data

Dec. 19, 1991 [HU] Hungary ................. 4045/91

[51] Int. Cl.$^5$ .................................. H01M 4/48
[52] U.S. Cl. .................. 429/224; 429/230; 429/57
[58] Field of Search .......... 429/224, 229, 230, 231, 429/206, 57, 59, 232, 245

[56] References Cited

U.S. PATENT DOCUMENTS

| | | | |
|---|---|---|---|
| 3,969,147 | 7/1976 | Croissant et al. | 429/229 X |
| 4,650,680 | 3/1987 | Brenner et al. | 429/94 X |
| 4,857,424 | 8/1989 | Larsen | 429/224 X |
| 4,925,747 | 5/1990 | Kordesch et al. | 429/59 |
| 4,957,827 | 9/1990 | Kordesch et al. | 429/224 X |
| 5,043,234 | 8/1991 | Tomantschger et al. | 429/229 X |
| 5,069,988 | 12/1991 | Tomantschger et al. | 429/224 X |

FOREIGN PATENT DOCUMENTS 0481338  4/1992  European Pat. Off. ............... 6/22

OTHER PUBLICATIONS

"Das (übervundene) Quecksibberproblem der Primärzellentechinik" Dechema-Monographien Band 124, VCH Verlagsgesellschaft 1991, pp. 375-388.

Chemical Abstracts, vol. 104, No. 20, issued May 19, 1986, Columbus, Ohio, U.S.A., Teraoka Hirohito et al. "Mercury free alkaline batteries" p. 529, column 2, the abstract-No. 176 606g Jpn Kokai Tokkyo Koho JP 60,221,957.

*Primary Examiner*—Anthony Skapars
*Attorney, Agent, or Firm*—Donald E. Hewson

[57] ABSTRACT

Low mercury or mercury free primary or secondary alkaline manganese dioxide-zinc cell that comprises a manganese dioxide cathode with a manganese dioxide active material and a conductive powder. The active material and powder are uniformly mixed and pressed to form a porous cathode body. The cell further comprises a gelled zinc anode, a separator between the cathode and the anode, and an alkaline electrolyte. The anode gel comprises a modified starch as a gelling agent capable of releasing hydrogen gases developed during slow corrosion of zinc in the anode.

A hydrogen recombination system can be used in the cell to limit inside pressure within permitted limits by recombining the evolved hydrogen.

15 Claims, 3 Drawing Sheets

LOW MERCURY OR MERCURY FREE ALKALINE MANGANESE DIOXIDE-ZINC CELL

FIELD OF THE INVENTION

The invention relates to a low mercury or mercury free alkaline manganese dioxide—zinc cell, that comprises a manganese dioxide cathode with an electrolytic manganese dioxide active material and a conductive powder for increasing conductivity, in which the active material and the conductive powder are uniformly mixed and pressed to form a porous cathode body; together with a gelled zinc anode, a separator means arranged between the cathode and anode, and an alkaline electrolyte.

BACKGROUND OF THE INVENTION

Owing to the increased significance of environmental protection, recent research and development work in the battery field has been concentrated on decreasing or eliminating the use of mercury in primary and secondary cells. A low mercury cell cannot comprise more than 0.025 by weight of mercury which is equivalent to about 0.25% by weight of mercury content in the anode. (Hereafter, the term "wt. %" is used to indicate a percentage by weight of the indicated component).

It can be expected that in the foreseeable future the commercial sale of mercury containing cells will be prohibited in most industrialized countries.

While the elimination of the mercury content in cells is a reasonable requirement in view of environmental protection, this causes numerous problems regarding cell operation and performance.

These problems have been summarized in detail in the paper of D. von Borstel entitled: "Das (überwundene) Quecksilberproblem der Primärzellentechnik"—in English translation: "The (Overcome) Mercury Problem of Primary Cells Technique"—published in Dechema-Monographien Band 124 - VCH Verlagsgesellschaft 1991 pp. 375-388.

These problems are connected mainly with the following properties of cells without a sufficient amount of mercury:

increasaed generation of hydrogen gas due to zinc corrosion;

decreased loadability of the zinc; and decreased electrical conductivity of the zinc particles.

While the cited paper deals mainly with primary cells, in case of secondary (rechargeable) cells these problems are more serious, since the electrochemical processes will be repeated in all cycles; and with increased cycle number the initially less significant magnitude of these phenomena become more apparent.

There are different approaches to the ways how these adverse effects can be overcome. In the commercially available low mercury and mercury free alkaline manganese dioxide-zinc primary and secondary cells, corrosion inhibitor materials are added to the anode gel which decrease hydrogen evolution from the zinc particles. The use of these inhibitor materials causes, however, further problems, i.e., they decrease conductivity and cell performance under high current drains.

The performance of such commercially available low mercury or mercury free cells is noticeably inferior compared to those including mercury; they leak at elevated temperature, and in secondary cells the cycle capacity sharply decreases with increasing cycle number and therefore they have smaller cumulative capacity values than conventional cells have.

The object of the present invention is to provide a low mercury or mercury free alkaline manganese dioxide-zinc cell in which the above problems become less significant or are eliminated.

The invention is based on the discovery that the approach of using corrosion inhibitors is insufficient for solving the problems connected with the lack of mercury, since with increased corrosion inhibition properties the adverse effects will also be higher. Therefore, there will be no acceptable compromise concerning cell performance.

In contrast to this approach, it has been recognized that the corrosion of high purity zinc is a slow process, the hydrogen gas development lies in the range of 1-5 microliter/day/gram, and the thus developed hydrogen can be recombined. The purity of the zinc has, however, an increased significance, since in solutions contaminated with heavy metal ions or particles or other contaminating materials present in the cathode material (like iron, copper, nickel, manganese dioxide, graphite etc.) the gas development can be several thousand times as high as in case of pure zinc.

In accordance with the inventive approach, it has been discovered that starch, preferably epichlorhydrin modified starch, should be used in the anode as a gelling agent, preferably in an amount between about 0.5 to 4 wt. %. The use of starch as gelling agent has already been known in the prior art; however, it was always combined with a substantial amount of other gelling agents like carboxy methyl cellulose (CMC) or CARBOPOL, whereby such anode gels obtained gas bubbles retention properties.

Gels made using epichlorhydrin modified starch do not retain hydrogen bubbles developed in the anode.

The gas release properties of the anode gel improve still further if the gel contains 0.5 to 3 wt % magnesium oxide.

The gelling properties of epichlorhydrin modified starch improve substantially if the anode gel is made at elevated temperatures between about 40° C. and 65° C., preferably between 50° C. and 60° C.

In accordance with the inventive concept, care should be taken that an inside pressure build up within the cell will not exceed permitted limits. Therefore, the cell comprises a hydrogen recombination system. Such systems are known in the art and, based on their operational principles, can be grouped in one of two types. The first type is the fuel cell electrode hydrogen recombination system which operates electrochemically, and the second type is a chemical recombination system using a hydrogen recombination catalyst. The fuel cell type hydrogen recombination systems use generally an auxiliary electrode as disclosed in U.S. Pat. No. 4,925,747 issued to Kordesch et al, and their operation does not influence the rechargeability of manganese dioxide. The second type reduces manganese dioxide to crystalline compounds which are not reversible, and the reduced manganese dioxide cannot be recharged any more. However, if the rate of gas evolution is low, the loss of rechargeability can be negligibly low; therefore, this type of hydrogen recombination system can also be used a suggested in the cited in U.S. Pat. No. 4,925,727.

It belongs to the inventive concept to utilize all means to slow down the pressure increase in the cell and to increase the cell performance.

It has been found that most of the materials that increase corrosion come from the porous manganese dioxide cathode in the form of dust, and this kind of contamination can be reduced efficiently if a protective coating is provided on the cathode surface—which coating is an ion permeable and ionically conductive layer that enables, normal cell operation. The thickness range of the coating can vary between about 25 and 200 microns and the coating can be made from a solution that comprises 2 to 5 wt. % starch, a viscosity control additive and 1-5 wt. % magnesium oxide. The presence of starch in the layer is preferable, since it has good soaking properties with the KOH electrolyte and contributes to preserving the required electrolyte content of the cathode.

A further corrosion source can be the metal current collector for the negative terminal that must be in contact with the anode gel and which is made generally of brass, copper or bronze. According to a further inventive aspect, the corrosion caused by the current collector on overdischarge can be eliminated or reduced to a negligible extent if the current collector is coated with gold.

In view of hydrogen evolution, it is preferable that a 9 to 12N potassium hydroxide forms the electrolyte, since the rate of zinc corrosion at such concentrations is lower than in commonly used lower concentration KOH electrolytes.

A further drawback of mercury free anode gels is their decreased interparticle conductivity. This drawback can be eliminated if the anode gel comprises at least 0.1 wt. % of particles with gold coated surface. Such particles can take any form, i.e. they can be fibers, flakes, etc. In the case of fibers, it is preferred that they have a length to diameter ratio between 100:1 and 1000:1 and that they are plated with gold.

The cells according to the invention can both be primary or secondary cells. The combination of the above summarized means enables the production of mercury free rechargeable cells with performance comparable to cells containing mercury.

Such cells can be of the commonly used cylindrical form, but any other cell configuration can be well within the scope of the invention.

BRIEF DESCRIPTION OF THE DRAWINGS

The invention will now be described in detail in connection with preferable embodiment thereof, in which reference will be made to the accompany drawings. In the drawing.

DESCRIPTION OF THE PREFERRED EMBODIMENTS

Figure 1:
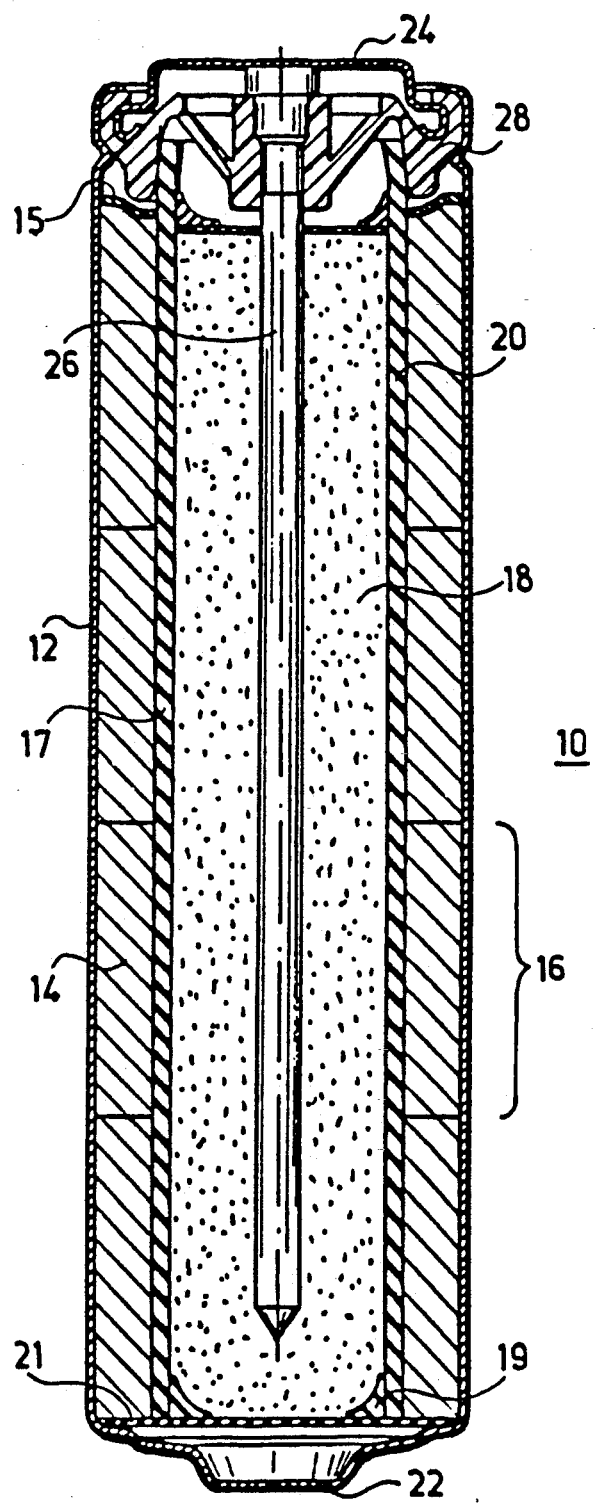
FIG. 1 shows the cross sectional elevation view of an alkaline manganese dioxide-zinc rechargeable cell.

FIG. 1 shows the cross sectional elevation view of an alkaline manganese dioxide-zinc rechargeable cell 10. The cell comprises the following main units: a steel can 12 defining a cylindrical inner space, a manganeses dioxide cathode 14 formed by a plurality of hollow cylindrical pellets 16 pressed in the can, a zinc anode 18 made of an anode gel and arrange din the hollow interior of the cathode 14, and a cylindrical separator 20 separating the anode 18 from the cathode 14. The ionic conductivity between the anode and the cathode is provided by the presence of potassium hydroxide electrolyte added into the cell in a predetermined quantity.

The can 12 is closed at the bottom and it has a central circular pip 22 serving as the positive terminal. The upper end of the can 12 is hermetically sealed by a cell closure assembly which comprises a negative cap 24 formed by a thin metal sheet, a current collector nail 26 attached to the negative cap 24 and penetrating deeply into the anode gel to provide electrical contact with the anode, and a plastic top 28 electrically insulating the negative cap 24 from the can 12 and separating gas spaces formed beyond the cathode and anode structures, respectively. The preferred material for making the current collector nail 26 is brass (Cu-Zn alloy), bronze (Cu-Sn alloy) or copper, and the nail is plated or coated by gold. The coating thickness has no specific significance, it is sufficient that a uniform coating is provided.

The cathode is made according to the following formulation (the percentage values are weight percents):

| | |
|---|---|
| manganese dioxide | 85.5% |
| graphite | 8.5% |
| acetylene black | 0.5% |
| silver (I) oxide | 0.5% |
| potassium hydroxide solution | 5.0% |

The dry (solid) components are uniformly mixed. In the mixing step, the KOH solution is added. The so obtained uniform mix is then pressed to form the ring—like pellets 16 shown in FIG. 1.

The silver(I) oxide together with the acetylene black and graphite form the hydrogen recombination catalyst as it is disclosed in the cited U.S. Pat. No. 4,925,747.

In an alternative embodiment, the upper face of the cathode can be covered by a thin ring 15 made of a fuel cell electrode (also described in U.S. Pat. No. 4,925,747).

The pellets 16 are pressed one by one into the can 12 (the ring-like bead at the upper portion of the can 12 is not yet made at this step).

To prevent the anode gel from contamination that might come from the cathode material, the inner surface of the cathode 14 is covered by a protective layer 17. The coating of the free cathode surfaces can be done e.g. by utilizing a spraying method. The solution forming the layer 17 is dispensed through a suitable nozzle (not shown) which makes an up-and-down motion. The spaying occurs at a predetermined range. During the spraying process the can/cathode assembly is rotated around its axis, whereby the coating solution will be evenly distributed on the free cathode surface.

In the application method, the coating solution is dried in a carbon dioxide free air at room temperature or preferably at 55° C.

The thickness of the coating can be adjusted by the spraying time and rate within wide ranges. A range between 25 and 200 micron is generally acceptable. The thicker range can be preferable if starch is used as a coating component, because it acts as an excellent reservoir for the electrolyte and can prevent the cathode surface from getting too dry during cell operation. The use of a thicker coating might fulfill the role of the separator, whereby there can be no need for a distinct separator.

In one embodiment, the layer 17 was made from a starch and water base coating solution. Such solution comprises 2-5 wt. % starch (commercially available under the trade name: AVEBE H.F. Farinex-267) dissolved in water. It should be noted that the application of coating solutions that comprise starch alone can be difficult, especially if very thin coatings are to be made. The difficulty lies in that muddy cracks might appear in the coating.

This problem can be overcome by the use of additives in the solution. A preferable additive can be e.g. The use of 1-2 wt. %. carboxy methyl cellulose (CMC) for viscosity control and for providing better coating behavior.

It is preferable that 1-5 wt. % magnesium oxide is added which gives the layer a well distinguishable white color, in which cracks or other surface errors become visible. This additive can be used as an appropriate means for quality control.

A preferable coating solution contains:
1.8 wt. % Starch AVEBE H.F. Farinex-267
1.8 wt. % CMC (Carboxy methyl cellulose sodium salt)
3.5 wt. % magnesium oxide
all dissolved in water and applied as referred to hereinabove.

The coating of the cathode is followed by the insertion of the separator 20 and the sealing of its bottom portion, e.g. by a thermoplastic sealant designated by 19 applied at the lower edge of the separator and the upper surface of a plastic washer 21 placed between the bottom of the can 12 and the lower end of the cathode.

The inner space defined by the hollow separator 20 is then filled by the anode gel 18.

An exemplary anode formulation is as follows:

| | |
|---|---|
| zinc powder | 62 wt. % |
| KOH, 45 wt. % | 33.3 wt. % |
| starch, (AVEBE Farinex 267) | 1.7 wt. % |
| ZnO | 2.0 wt. % |
| MgO | 1.0 wt. % |

These components were mixed at an elevated temperature of 50° C.

The starch used was an epichlorhydrin modified starch.

After filling the anode gel and saturating the cell interior with electrolyte (in the example 10N KOH), the top of the anode is covered by a gas permeable retaining member 21, and that is followed by placing the closure assembly to the position shown in FIG. 1.

The excellent performance of the rechargeable manganese dioxide-zinc LR6 cells made according to the invention will be illustrated with reference to FIGS. 2 to 4.

The cells were charged by a 1.72 V constant voltage charger through 15 hours and were then discharged through respective leads of 4 ohm and 10 ohm resistors until the cell voltage dropped to 0.9 V.

Figure 2:
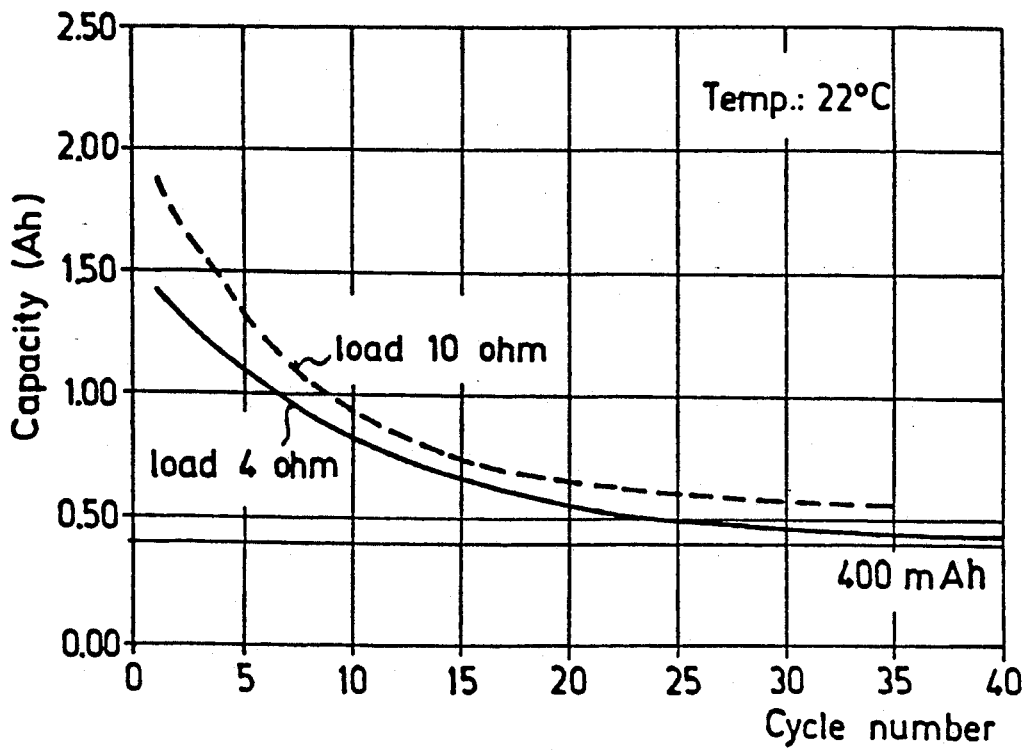
FIG. 2 shows cycle capacity versus cycle number curves of mercury free LR6 cells made according to the invention.
Figure 3:
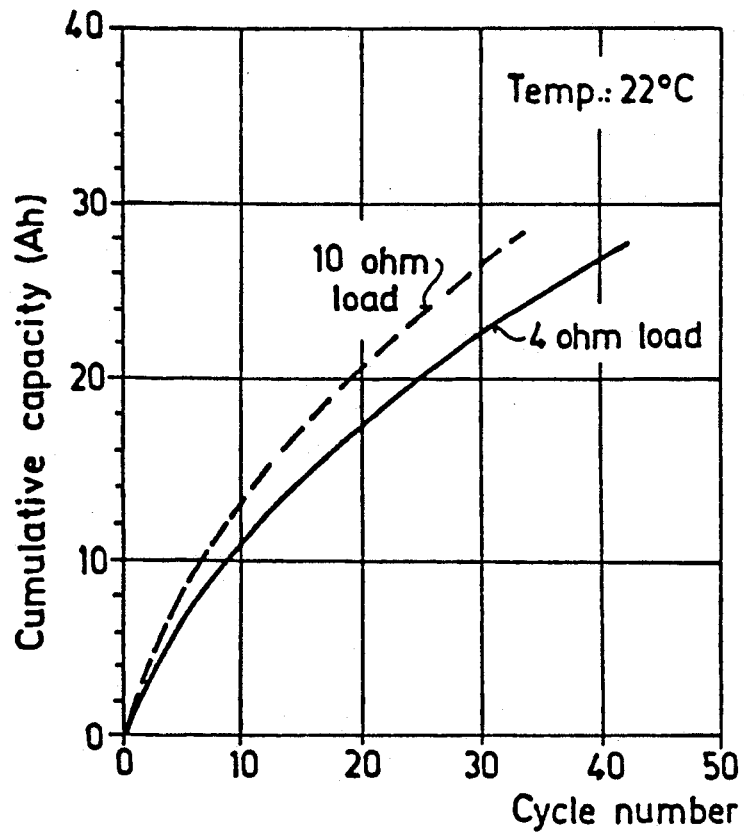
FIG. 3 shows the cumulative capacity values of these cells as a function of cycle number.

The cycle capacity versus cycle number curves are shown in FIG. 2 for both kinds of loads, while FIG. 3 shows the cumulative capacity values as a function of cycle number.

The curves demonstrate that the performance of the mercury free rechargeable cells according to the invention is comparable to that of mercury containing conventional rechargeable cells.

A further test series was carried out with the cells made according to the invention, in which a group of 20 LR6 cells was stored at a temperature of 65° C. for four weeks. Following this storage, the cells were cycled as the ones shown in FIGS. 2 and 3. It should be noted that no one of the cells leaked or bulged following the 4 weeks period. It is generally known in the art that a week storage at 65° C. corresponds to one year storage at room temperature.

Figure 4:
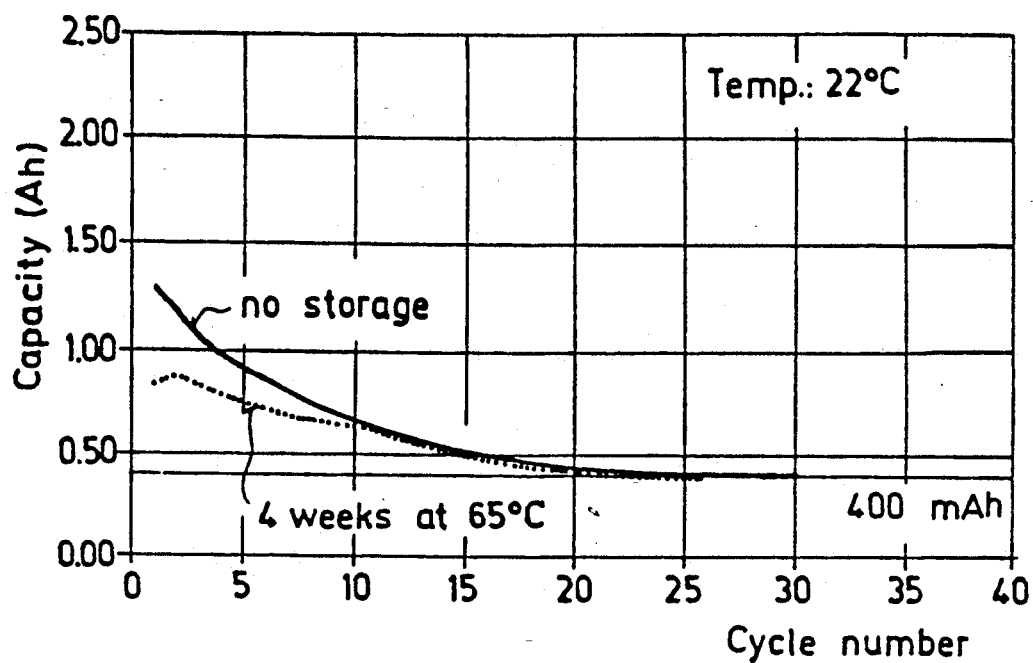
FIG. 4 is similar to FIG. 2 but relates to cells stored for four weeks at 65° C. temperature.

FIG. 4 shows the capacity versus cycle number curves of these test cells and ones which were not exposed to the high temperature test. It can be seen that the cells stored at the elevated temperature had less capacity in the first few number of cycles, but later the difference decreased and after about the tenth cycle they behaved just as the control cells.

What is claimed is:

1. A mercury free alkaline manganese dioxide-zinc cell (10), comprising a manganese dioxide chamber (14) that has a manganese dioxide active material and a conductive powder, said active material and powder being uniformly mixed and pressed to form a porous cathode body, a gelled zinc anode (18), a separator means (20) between said cathode and anode, and an alkaline electrolyte;

wherein said anode gel comprises a modified starch as a gelling agent, and is capable of releasing hydrogen gases developed during slow corrosion of zinc present in the anode;

wherein said cell includes a hydrogen recombination system for recombining and limiting the presence of in-cell hydrogen gas;

wherein a protective coating is provided on the boundary surface of said cathode with said separator system, said coating being an ion permeable and ionically conductive layer enabling normal cell operation; and wherein said protective coating prevents said anode from being contaminated by any corrosive dust that may be present in the cathode.

2. The cell as claimed in claim 1, wherein said cell has a cylindrical structure, and in which said cathode, separator and anode are arranged coaxially in one another.

3. The cell as claimed in claim 1, wherein said starch is an epichlorhydrin modified starch present in an amount between about 0.5 to 4 wt. % in said anode.

4. The cell as claimed in claim 1, wherein said anode comprises 0.5 to 3 wt. % magnesium oxide.

5. The cell as claimed in claim 1, wherein said coating has a thickness range between about 25 and 200 microns.

6. The cell as claimed in claim 5, wherein said coating is made from a solution that comprises 2 to 5 wt. % starch, a viscosity control additive, and 1-5 Wt. % magnesium oxide.

7. The cell as claimed in claim 1, characterized by comprising a current collector made of an alloy selected from a group consisting of brass, copper and bronze, and wherein said current collector is provided with a gold coating.

8. The cell as claimed in claim 1, wherein said anode gel comprises at least 0.1 wt. % of particles having a gold coated surface.

9. The cell as claimed in claim 8, wherein said particles are fibers with a length to diameter ratio between 100:1 to 1000:1.

10. The cell as claimed in claim 8, wherein said gold coated surface is provided by plating said particle with gold.

11. The cell as claimed in claim 1, wherein said cell is a rechargeable cell.

12. The cell as claimed in claim 1, wherein said cell is a primary cell.

13. A low mercury alkaline manganese dioxide-zinc cell(10), comprising a manganese dioxide cathode (14) that has manganese dioxide active material and a conductive powder, said active material and powder being uniformly mixed and pressed to form a porous cathode body, a gelled zinc anode (18), a separator means (20) between said cathode and anode, and an alkaline electrolyte;

wherein said anode gel comprises a modified starch as a gelling agent, and said starch is an epichlorhydrin modified starch which is present in an amount between about 0.5 and 4 wt. %;

wherein said anode gel is capable of releasing hydrogen gases developed during corrosion of zinc present in the anode;

wherein said cell includes a hydrogen recombination system for recombining and limiting the presence of in-cell hydrogen gas;

wherein a protective coating is provided on the boundary surface of said cathode with said separator system, said coating being an ion permeable and ionically conductive layer enabling normal cell operation; and and wherein said protective coating prevents said anode from being contaminated by any corrosive dust that may be present in the cathode.

14. The cell as claimed in claim 1, wherein said anode gel is made by mixing components thereof at an elevated temperature between about 40° C. and 65° C.

15. The cell as claimed in claim 1, wherein said electrolyte is potassium hydroxide with a normality of 9-12.

* * * * *